May 16, 1933.  L. W. ROSENTHAL  1,909,899
BRAKE FOR TOY ELECTRIC RAILWAYS
Filed Jan. 21, 1931  2 Sheets-Sheet 1

INVENTOR
Leon W. Rosenthal
By [signature]
Atty.

May 16, 1933.  L. W. ROSENTHAL  1,909,899
BRAKE FOR TOY ELECTRIC RAILWAYS
Filed Jan. 21, 1931   2 Sheets-Sheet 2

INVENTOR
Leon W. Rosenthal
By [signature]
Atty.

Patented May 16, 1933

1,909,899

UNITED STATES PATENT OFFICE

LEON W. ROSENTHAL, OF NEW YORK, N. Y.

BRAKE FOR TOY ELECTRIC RAILWAYS

Application filed January 21, 1931. Serial No. 510,191.

This invention relates to means for stopping a toy electric railway train, and preferably comprises braking mechanism arranged to frictionally or otherwise engage a movable or stationary part.

Preferably, the braking mechanism is arranged to be magnetically, electromagnetically or electrically operated, and preferably whenever the current to the power rail or motor is turned on and off. In a preferred embodiment of the invention the said braking mechanism is set or applied to make frictional engagement with a suitable part whenever the current to the power device, such as the third rail or the propelling motor, is turned off, and returned to its inoperative or retracted position when the current is turned on. The braking mechanism preferably comprises a brake shoe which may be arranged to make frictional contact with one or more rails or wheels, and said brake shoe may be disposed on the locomotive or other car of the train.

It is broadly an object of this invention to provide braking mechanism which shall automatically move into effective braking operation whenever conditions call for the train to be brought to a stop. And it is also an object to provide means whereby said braking mechanism shall be automatically retracted when the train is arranged to continue on its travel.

It is, of course, desirable that where the braking mechanism is electrically or electromagnetically controlled, that said control shall involve the use of little or no current, and to that end there are provided means requiring little or no energy in the operation of said braking mechanism. For one thing, the braking member is preferably one which is applied by gravity. For another, it is contrived to have electromagnetic means for retracting said braking member which automatically cuts off current from itself after said member is retracted, auxiliary and non- or little-energy consuming apparatus being provided to hold said braking member in retracted position.

Again, the magnetism or magnetic field of the motor, stray or otherwise, may be utilized to retract and hold the braking member, and the collapse of said magnetism to allow the braking member to fall by gravity into braking position.

In the accompanying drawings are illustrated the foregoing and other means for putting this invention into effect.

Figure 1:
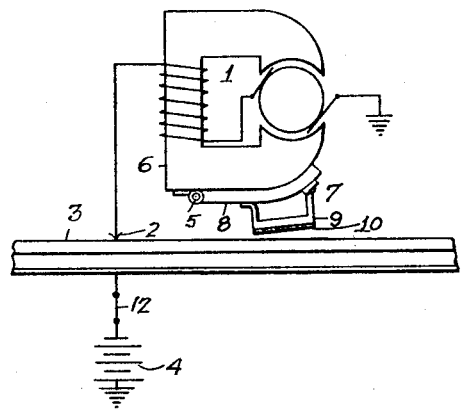
Figure 2:
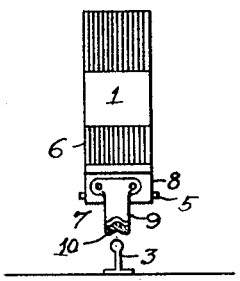
Figure 3:
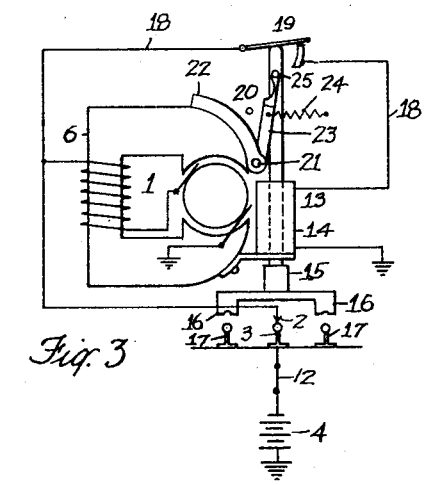
Figure 4:
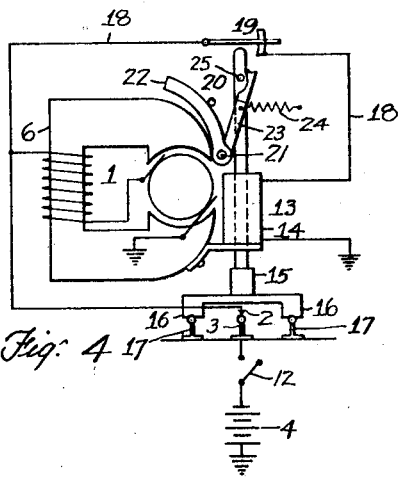
Figures 5, 6:
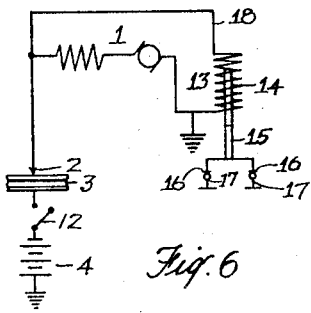
Figure 7:
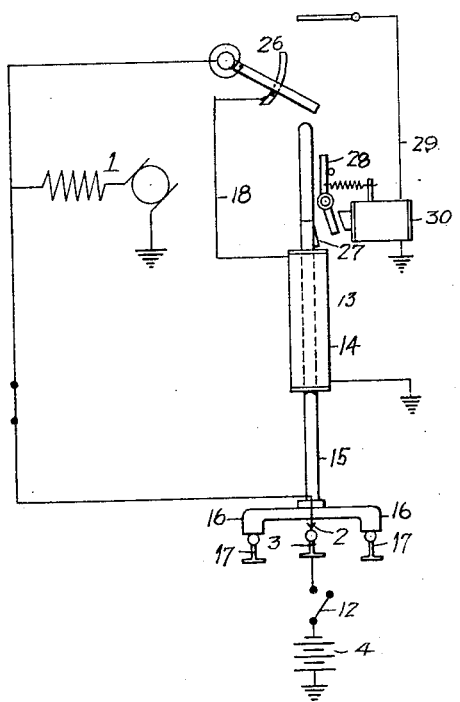
Figure 8:
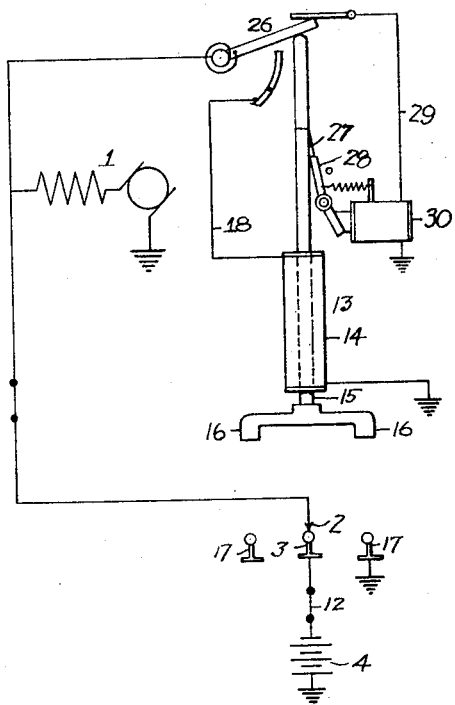
Figure 9:
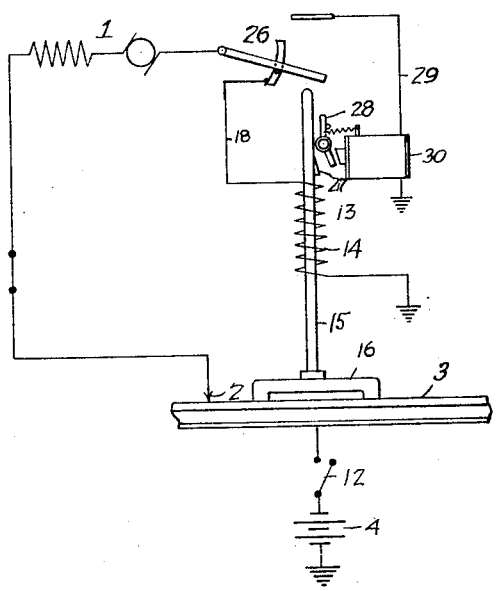
Figure 10:
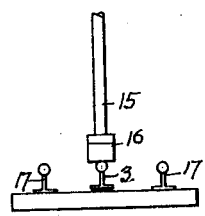

Fig. 1 shows an arrangement for utilizing the stray magnetism of the motor to retract and hold the braking mechanism; Fig. 2 is an end view thereof; Fig. 3 discloses a solenoid-actuated braking mechanism and means controlled by the stray magnetism of the motor to latch and unlatch (or hold and release) the brake of said mechanism in and from retracted position; Fig. 4 is a similar view showing the brake applied and the latching mechanism in release position, in contradistinction to Fig. 3 which shows the brake in retracted position and the latching mechanism in locked position; Fig. 5 discloses a solenoid for actuating the brake in series with a motor, and Fig. 6 the solenoid connected in parallel with said motor; Fig. 7 is a modified form of the arrangement shown in Fig. 3, wherein there is substituted a holding magnet operating on a latching or holding member; Fig. 8 is a view similar to Fig. 7 showing the brake in its retracted position, whereas in Fig. 7 the brake is shown in its applied position; Fig. 9 differs from Fig. 7 in that the solenoid of the braking mechanism is here connected in series instead of in parallel, and the brake is applied to only one rail instead of across two rails; and Fig. 10 is a detail of Fig. 9 in end view.

Referring particularly to Figs. 1 and 2, there is shown a propelling motor 1 having a collecting shoe 2 in contact with a power rail 3 connected to a power source, such as battery 4. Pivoted at 5 to the motor frame 6 is braking mechanism 7 comprising an armature member 8 and a brake shoe 9 having a fibre brake lining 10. When the motor is receiving propelling current, there is created about or external of the motor stray magnetism or a magnetic field, the effect of which is to attract the armature member 8 of the braking mechanism to and hold the same against the motor frame as long as this stray magnetism exists. Just as soon as this stray magnetism collapses, as is the case when current to the motor is interrupted, the braking mechanism drops by gravity into braking position. Usually, a switch 12 is provided in toy electric railways for connecting and disconnecting the power rail from the power source. It will be apparent, therefore, that when the power rail is disconnected from the power source, the braking mechanism automatically falls into braking position, because of the collapse of the stray magnetism coincident with the interruption of the motor propelling current. Conversely, when the power rail is connected to the power source, the braking mechanism is automatically retracted by and due to the creation of the stray magnetism coincident with the application of propelling current to said motor.

Referring now to Figs. 3 and 4, there is shown an electromagnetic braking mechanism 13 comprising a solenoid 14 for retracting the braking member 15 having two brake shoes 16, 16 for frictionally engaging the track rails 17, 17. The solenoid is shown connected in parallel with the motor circuit, but it may be connected in series therewith. The solenoid circuit 18 is provided with a switch 19 which is disposed in the path of the braking member 15 so that when said member is retracted it will open said switch to automatically interrupt the current to said solenoid, and which falls by gravity to close the switch as shown in Fig. 4 when the braking member drops. In order to hold said braking member in retracted position there is provided the latching or holding mechanism 20 which is pivoted at 21 in proximity to the motor and arranged to be acted upon by the aforesaid magnetic field of the motor. The said latching mechanism comprises an armature member 22 and a latching member 23, and is normally held out of latching position by the spring 24. However, as explained above, when the motor is receiving current the magnetic field created thereby is sufficiently intense to draw the armature member into latching position against the tension of said spring.

The operation of the mechanism just described is as follows: Referring to Fig. 3, it will be observed that the switch 12 is closed, so that the power rail is connected to the power source and the motor is receiving propelling current. The magnetic field created thereby attracts and holds the latching mechanism in latching position so that the latching member engages the pin 25 of the braking member to support the latter in retracted position. At the same time the solenoid switch is kept open by the braking member. Fig. 4 shows the relation of the parts when the power rail is disconnected from the power source. The switch 12 is open. When it was opened current ceased to flow to the motor, and with it the collapse of the aforementioned magnetic field occurred. The latching mechanism therefore was pulled out of latching position by the spring 24. With the support for said braking member removed by the withdrawal of the latching member, the braking member falls by gravity, and as it does so the solenoid switch closes. The solenoid circuit is now closed, and it will be obvious that when the power rail is connected to the power source, current will flow through said solenoid and the braking member will be raised out of braking contact with the rails. And that is the condition of Fig. 3 which shows the arrangement of all the parts when the switch 12 is closed. With the closure of said switch, current flows through both the motor and the solenoid. At approximately the same time that the braking member is lifted from braking position, the magnetic field of the motor acts on the latching member to eventually bring it beneath the pin on the braking member. Toward the end of the retracting throw of said braking member it opens the solenoid switch to automatically cut off the current to said solenoid.

It will thus be seen that in the arrangement of Figs. 3 and 4, there are provided electromagnetic means for operating a braking member, noncurrent consuming means for holding said braking member in retracted position, and an arrangement for automatically cutting off the current to the first named means.

In Fig. 5 the solenoid is a series with the motor, and there are no means, other than the said solenoid, for holding the braking member in retracted position. This scheme, while satisfactory, is not as economical or as desirable, since it requires the consumption of energy to hold the braking member in retracted position. The operation of this arrangement is obvious. Fig. 6 is similar to Fig. 5 with the solenoid in parallel with the motor.

Figs. 7, 8 and 9 show modifications of the arrangement disclosed in Figs. 3 and 4. Here, instead of the latching mechanism being actuated by the magnetic field of the motor, there is provided a separate holding magnet 30 for accomplishing that purpose. This magnet is preferably low-current consuming and is arranged to be connected, alternately with the solenoid, to the power rail through a two circuit switch 26. As in Figs. 3 and 4, this switch is arranged to be automatically actuated through the rise and fall or reciprocation of the braking member. The said member is provided with a lug 27 arranged to be engaged by the spring-retracted, magnet-projected latching lever 28 to support the said braking member in raised or retracted position.

Figs. 7 and 9 show the relation of the parts with power off. Fig. 8 shows the relation of the parts with power on. Fig. 9 differs from Fig. 7 only in that the solenoid is in series with the motor and the braking member is arranged to engage only one rail.

The operation of the foregoing apparatus is as follows: When the switch 12 is closed, current flows through the solenoid. The braking member is retracted by the electromagnetic pull of the solenoid. The said member opens the switch in the solenoid circuit and thence closes the switch in the holding magnet circuit 29, whereupon current then flows through said magnet. The lower end of the pivoted latching lever 28 is drawn toward said magnet while the upper end moves toward the braking member to engage the lug 27. Current continues to flow through the holding magnet while the parts are in the position shown in Fig. 8, that is, with power on and brake off. When the power is switched off, as when the switch is opened, then the current to the holding magnet is discontinued. The lever 28 is retracted by its spring out of latching engagement with the braking member. The braking member thereby drops by gravity. At the same time the switch in the holding magnetic circuit is opened and the switch in the solenoid circuit closed. And this is the state of affairs in Fig. 7. When the switch 9 is closed, then the parts assume the positions shown in Fig. 8 as explained.

The brake shoes of the embodiments of Figs. 3–10 may be lined or unlined, and may be of non-magnetic material or a permanent magnet to increase the friction when in engagement with the iron rail or rails.

Having described my invention, what I claim:

1. In combination, a track for a toy electric train, a train propelling power device to be carried on said train, a power source, means for connecting and disconnecting said device from said power source, and braking mechanism comprising a part carrying a shoe and mounted to be pulled down by gravity when released to cause the shoe to engage the track, so associated with said device and operated thereby that when said device is disconnected from said source said mechanism is automatically applied and when said device is connected to said source said mechanism is automatically retracted.

2. In combination, a track for a toy electric train, a propelling motor to be carried on said train, a power source, means for connecting and disconnecting said motor from said power source, and braking mechanism comprising a part carrying a shoe and mounted to be pulled down by gravity when released to cause the shoe to engage the track, so associated with said motor and operated thereby that when said motor is disconnected from said source said mechanism is automatically applied and when said motor is connected to said source said mechanism is automatically retracted.

3. In combination, a track for a toy electric train, a propelling motor to be carried on said train, a power source, means for connecting and disconnecting said motor from said power source, and braking mechanism comprising a part carrying a shoe and mounted to be pulled down by gravity when released to cause the shoe to engage the track, in circuit with said motor and so arranged that when said motor is disconnected from said source said mechanism is automatically applied and when said motor is connected to said source said mechanism is automatically retracted by said motor.

4. In a toy electric train, a propelling electric motor and a brake arranged to be directly operatively controlled by said motor, the brake comprising a part mounted to drop by gravity when the motor is deenergized and a part carried by the brake for then engaging the track on which the train operates.

5. In a toy electric train, a propelling electric motor, and a brake arranged to be operatively controlled by the magnetic field of the motor, the brake comprising a part mounted to drop by gravity when the motor is deenergized and a part carried by the brake for then engaging the track on which the train operates.

6. In a toy electric train, a propelling motor, a brake, electromagnetic means for retracting said brake from braking position, and means for latching and releasing the brake of said mechanism controlled by the magnetic field of the motor.

7. In toy electric train, a brake, electromagnetic means for retracting said brake from braking position, and automatically operative means for latching said brake in retracted position.

8. In a toy electric train, a brake, electromagnetic means for retracting said brake from braking position, and automatically operative means for latching said brake in retracted position and releasing the same from retracted position.

9. In a toy electric train, a gravity brake comprising a part mounted for movement by gravity when released, said part carrying a shoe for then engaging the track on which the train operates, and train propelling power means for retracting said brake from braking position.

10. In a toy electric train, a gravity brake comprising a part mounted for movement by gravity when released, said part carrying a shoe for then engaging the track on which the train operates, and power means for retracting said brake from braking position, and means actuated by said part for cutting off the supply of current to the power means upon said retraction.

11. In a toy electric train, a gravity brake comprising a part mounted for movement by gravity when released, said part carrying a shoe for then engaging the track on which the train operates, power means for retracting said brake from braking position, and means for holding said brake in retracted position.

12. In a toy electric train, a gravity brake comprising a part mounted for movement by gravity when released, said part carrying a shoe for then engaging the track on which the train operates, automatically operative means for retracting said brake from braking position, and electromagnetically actuated means for holding said brake in retracted position.

13. In a toy electric train, a gravity brake, electromagnetic means for retracting said brake from braking position, electromagnetically actuated means for holding said brake in retracted position, and a switch actuated by said brake to alternately connect and disconnect said electromagnetic means.

14. In a toy electric railway system, a power source, a power rail, a car carrying braking mechanism, electromagnetic means for actuating said mechanism deriving its operating current directly from said rail, said mechanism being arranged to be applied when power is off and retracted when power is on, and means for holding said mechanism in retracted position, said mechanism comprising a part mounted to be drawn down by gravity and carrying a shoe to engage the track of the system when said rail is disconnected.

15. In a toy electric train, a brake, and power means for retracting and holding said brake, the power for holding said brake being arranged to be less than that employed for retracting said brake, the latter comprising a part freely mounted to be drawn down by gravity and carrying a shoe to engage the track upon which the train runs when the power holding the shoe retracted is cut off.

16. In a toy electric train, a brake, electromagnetic means for retracting said brake, and non-current consuming magnetic means for holding said brake in retracted position, the latter comprising a part freely mounted to be drawn down by gravity and carrying a shoe to engage the track upon which the train runs when the power holding the shoe retracted is cut off.

17. In a toy electric train, the combination of a motor to propel the train, a brake on the train and comprising a part mounted to be drawn down by gravity, a shoe on said part to engage the track on which the train runs when said part is drawn down, and means for holding said part in raised position with the shoe disengaged from the track when the motor is propelling the train and operative to release said part when the motor ceases to be operated.

18. In a toy electric train, a propelling electric motor, a brake mounted to be actuated by gravity into effective position, said motor having a field providing magnetism to enable the brake to be controlled, the brake being disposed adjacent the motor and being retracted by the magnetism thereof so as to be released when the motor ceases to operate.

In testimony whereof I affix my signature.

LEON W. ROSENTHAL.